United States Patent
Engel et al.

(10) Patent No.: US 11,477,934 B2
(45) Date of Patent: Oct. 25, 2022

(54) WING HINGE COUPLING DEVICE

(71) Applicant: CNH Industrial Canada, Ltd., Saskatoon (CA)

(72) Inventors: Gordon Anthony Engel, Saskatoon (CA); Dennis W. Chahley, Saskatoon (CA)

(73) Assignee: CNH Industrial Canada, Ltd., New Holland (CA)

( * ) Notice: Subject to any disclaimer, the term of this patent is extended or adjusted under 35 U.S.C. 154(b) by 842 days.

(21) Appl. No.: 16/245,637

(22) Filed: Jan. 11, 2019

(65) Prior Publication Data
US 2020/0221638 A1     Jul. 16, 2020

(51) Int. Cl.
| A01B 73/04 | (2006.01) |
| F16L 37/08 | (2006.01) |
| A01D 41/14 | (2006.01) |

(52) U.S. Cl.
CPC .......... *A01B 73/042* (2013.01); *A01D 41/144* (2013.01); *F16L 37/082* (2013.01)

(58) Field of Classification Search
CPC ........................... A01B 73/042; A01D 41/144; A01D 78/1014; F16L 37/082
USPC ....................................................... 172/311
See application file for complete search history.

(56) References Cited

U.S. PATENT DOCUMENTS

| 2,087,916 A | 7/1937 | Lanninger |
| 2,253,232 A | 2/1940 | Gheen |
| 3,039,721 A * | 6/1962 | Rogers .................. B64D 37/04 244/135 R |
| 3,057,559 A | 10/1962 | Ingram et al. |
| 3,352,573 A | 11/1967 | Canning |
| 3,477,743 A | 11/1969 | Di Bartolomeo |
| 3,558,161 A | 1/1971 | Bormioli |
| 3,592,239 A | 7/1971 | Adler |
| 3,731,684 A | 5/1973 | Spiegel |
| 3,815,941 A | 6/1974 | Snyder |
| 3,828,403 A | 8/1974 | Perrin et al. |
| 3,861,419 A | 1/1975 | Johnson |
| 3,866,956 A | 2/1975 | Weinhold |
| 3,951,165 A | 4/1976 | Seger et al. |

(Continued)

OTHER PUBLICATIONS

Brochure for Sani-Lock "Quick Connect" Clamp for Hose and Pipe Fittings and Adapters, Rubber Fab Technologies Group, Sparta, New Jersey (4 pages).

*Primary Examiner* — Thomas B Will
*Assistant Examiner* — Joel F. Mitchell
(74) *Attorney, Agent, or Firm* — Rebecca L. Henkel; Rickard K. DeMille

(57) ABSTRACT

An agricultural implement including a frame with a main frame section and at least one wing frame section such that the agricultural implement is configured for transitioning in between a work position and a transport position, at least one conveyance line, and at least one coupling device. The at least one coupling device includes a first coupling member attached to the first line portion and a second coupling member movably connected to the first coupling member and attached to the second line portion such that the at least one coupling device couples the first line portion and the second line portion of the at least one conveyance line in the work position and uncouples the first line portion and the second line portion of the at least one conveyance line in the transport position.

18 Claims, 3 Drawing Sheets

(56) References Cited

U.S. PATENT DOCUMENTS

| | | | |
|---|---|---|---|
| 3,977,540 A | | 8/1976 | Gaser |
| 4,366,666 A | * | 1/1983 | van der Lely ..... A01D 78/1014 |
| | | | 56/370 |
| 4,493,590 A | | 1/1985 | Ayers et al. |
| 4,518,277 A | | 5/1985 | Bush et al. |
| 4,666,192 A | | 5/1987 | Zamora |
| 4,715,404 A | | 12/1987 | Fusy |
| 4,922,699 A | * | 5/1990 | Gantzer ............... A01B 73/042 |
| | | | 56/367 |
| 4,923,219 A | | 5/1990 | Bormioli |
| 5,176,407 A | | 1/1993 | Vaughn et al. |
| 5,782,499 A | | 7/1998 | Gfrerer et al. |
| 5,980,389 A | * | 11/1999 | Nienhaus ............... A01B 71/06 |
| | | | 464/172 |
| 6,050,615 A | | 4/2000 | Weinhold |
| 6,254,145 B1 | | 7/2001 | Schwarz et al. |
| 6,523,230 B1 | | 2/2003 | Weinhold |
| 6,644,001 B2 | * | 11/2003 | Krone .................. A01B 63/106 |
| | | | 172/311 |
| 7,467,668 B2 | | 12/2008 | Kimball |
| 7,614,206 B2 | | 11/2009 | Tippery et al. |
| 8,474,880 B2 | | 7/2013 | Gill |
| 2009/0194994 A1 | | 8/2009 | Weinhold |
| 2013/0300107 A1 | | 11/2013 | Lavagnini |

* cited by examiner

WING HINGE COUPLING DEVICE

BACKGROUND OF THE INVENTION

The present invention pertains to agricultural implements and, more specifically, to folding agricultural implements that fold in between a work position and a transport position.

Agricultural planting implements, which are towed by an agricultural vehicle, such as a tractor, can be used to work the field and/or deposit particulate matter, e.g. seed or fertilizer, onto the field. For example, agricultural planters or air seeders are generally used to simultaneously plant multiple rows of crop material by creating furrows in the field, depositing seed within the furrows, and closing the furrows by packing soil on top of the planted seeds. Although agricultural implements can be designed in numerous different configurations, they generally include a frame, various ground-engaging tools attached to the frame, and conveyance lines, such as hydraulic lines, pneumatic air lines, and/or particulate matter lines.

Modern day agricultural implements can have convertible frames which allow the agricultural implement to be pivoted, folded, or stacked in between a working, field position and a non-working, transport position in order to balance field-working efficiency, i.e., maximizing the agricultural implement's width to accomplish more work in a single pass, with roadway requirements which typically require a minimalized profile. Pivoting agricultural implements may have a telescoping hitch assembly which extends outwardly as the entire toolbar rotates about a centrally located pivot axis in order have the length of the agricultural implement be parallel with the direction of travel. Folding agricultural implements may vertically, forwardly and/or rearwardly fold one or more wing frame members to minimize the overall width of the frame. Stacking agricultural implements may include a center frame and a pair of foldable wing portions which vertically stack above the center frame.

Such agricultural implements, which convert between working and transport positions, generally include various conveyance lines that run from the main frame portion to the wing frame section(s). As can be appreciated, when a wing frame section folds and/or stacks, the conveyance lines must also correspondingly bend or otherwise flex with the movement of the wing frame section. A manufacture will typically allow for extra length in the conveyance line at the pivot connection of the main frame and wing frame section(s) in order to allow a respective conveyance line to bend or flex around a respective joint. However, the extra length in each conveyance line may nevertheless cause the conveyance lines to become kinked, torn, stretched, and/or scuffed upon folding or unfolding the wing frame section(s). Additionally, the extra length in the conveyance lines may lead to increased friction through the line, especially in the case of pneumatic lines.

What is needed in the art is a system for allowing agricultural implements to efficiently convert in between a work position and a transport position.

SUMMARY OF THE INVENTION

In one exemplary embodiment formed in accordance with the present invention, there is provided a wing hinge coupling device for an agricultural implement that removably couples respective portions of a conveyance line that runs between a main frame section and a wing frame section. The wing hinge coupling device allows the conveyance line to pivot, e.g. (dis)connect, such that the wing portion can fold into and out of its transport position without causing damage to the conveyance line.

In another exemplary embodiment formed in accordance with the present invention, there is provided an agricultural implement including a frame with a main frame section and at least one wing frame section movably connected to the main frame section such that the agricultural implement is configured for transitioning in between a work position and a transport position in which the at least one wing frame section is stored relative to the main frame section, at least one conveyance line supported by the frame and having a first line portion associated with the main frame section and a second line portion associated with the at least one wing frame section, and at least one coupling device, supported by the frame. The at least one coupling device includes a first coupling member attached to the first line portion of the at least one conveyance line and a second coupling member movably connected to the first coupling member and attached to the second line portion of the at least one conveyance line such that the at least one coupling device couples the first line portion and the second line portion of the at least one conveyance line in the work position and uncouples the first line portion and the second line portion of the at least one conveyance line in the transport position.

In yet another exemplary embodiment formed in accordance with the present invention, there is provided a coupling device for an agricultural implement having a main frame section, a wing frame section pivotally attached to the main frame section such that the agricultural implement can unfold and fold in between a work position and a transport position, and at least one conveyance line. The coupling device includes a first coupling member configured for attaching to a first line portion of the at least one conveyance line associated with the main frame section, and a second coupling member pivotally connected to the first coupling member at a pivot axis and configured for attaching to a second line portion of the at least one conveyance line associated with the wing frame section such that the first and second coupling members are configured for unfolding to couple the first line portion and the second line portion of the at least one conveyance line in the work position and for folding to uncouple the first line portion and the second line portion of the at least one conveyance line in the transport position.

In yet another exemplary embodiment formed in accordance with the present invention, there is provided a method including the step of providing an agricultural implement. The agricultural implement includes a frame with a main frame section and at least one wing frame section pivotally connected to the main frame section, thereby defining a hinge line, such that the agricultural implement is configured for pivoting in between a work position and a transport position in which the at least one wing frame section is folded relative to the main frame section, at least one conveyance line supported by the frame and having a first line portion associated with the main frame section and a second line portion associated with the at least one wing frame section, and at least one coupling device, supported by the frame, and including a first coupling member attached to the first line portion of the at least one conveyance line and a second coupling member pivotally connected to the first coupling member at a pivot axis and attached to the second line portion of the at least one conveyance line. The method includes the further steps of unfolding the first and second coupling members to couple the first line portion and the second line portion of the at least one conveyance line by unfolding the at least one coupling device as the at least one wing frame section unfolds relative to the main frame section to be in the work position, and folding the first and second coupling members to uncouple the first line portion and the second line portion of the at least one conveyance line by folding the at least one coupling device as the at least one wing frame section folds relative to the main frame section to be in the transport position.

One possible advantage of the exemplary embodiment of the agricultural implement is that the wing hinge coupling device allows for wing flex during normal field operating conditions as well as for the selective separation of the conveyance line so that it is not damaged during folding of the wing frame section.

Another possible advantage of the exemplary embodiment of the agricultural implement is that the wing hinge coupling device reduces wear of the conveyance line which in turn reduces the service cost of the agricultural implement.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
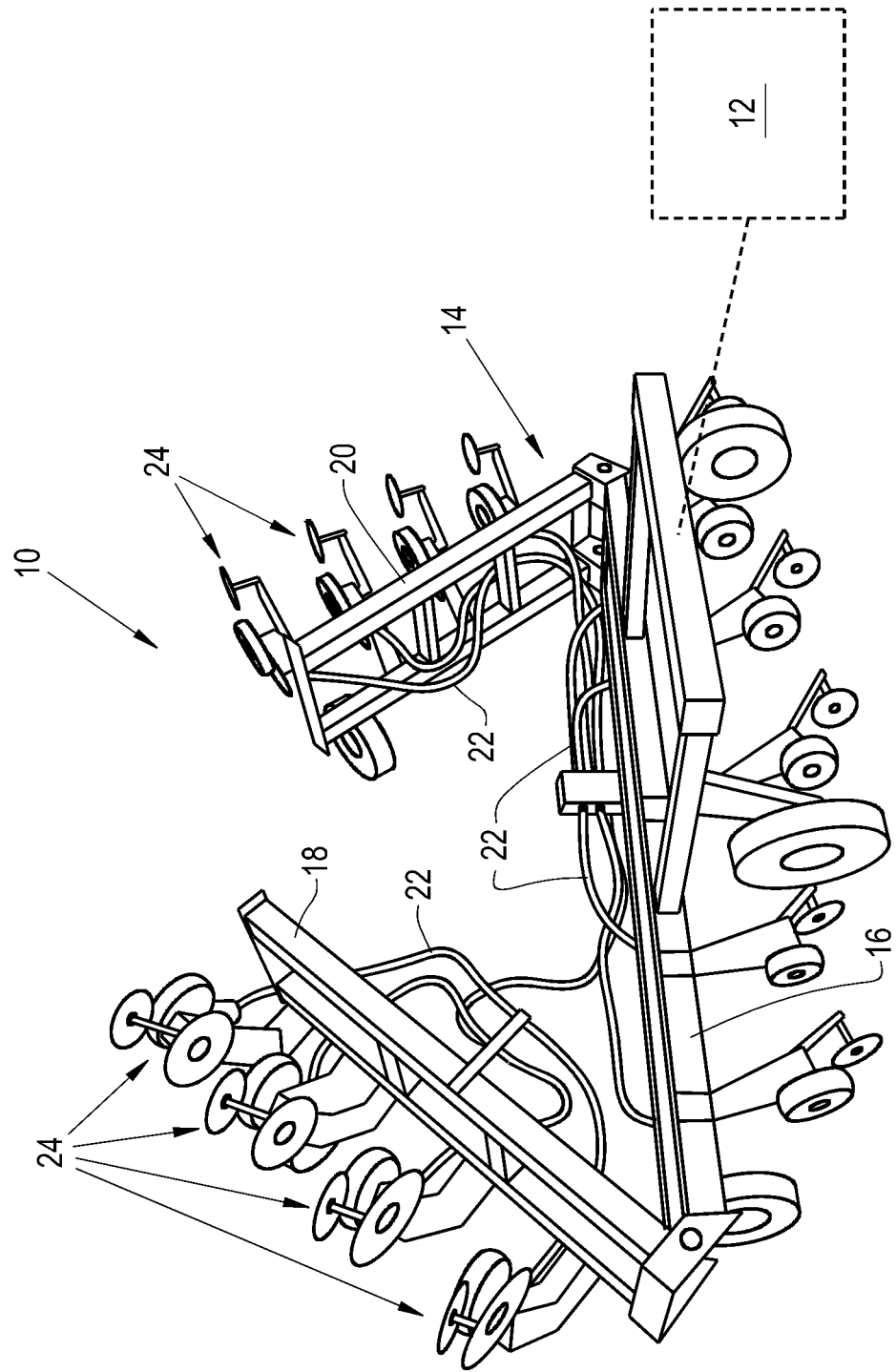
FIG. 1 illustrates a perspective view of a known agricultural implement in a transport position.

Referring now to the drawings, and more particularly to FIG. 1, there is shown a known agricultural implement 10 that may be towed behind an agricultural vehicle 12, such as a tractor, through a field in a forward direction of travel. The agricultural implement 10 may be transitioned in between a work position (not shown) for field use and a transport position, as shown in FIG. 1, for transporting the agricultural implement 10 along a roadway. The agricultural implement 10 may pivot about a central pivot point to align its lateral axis with the direction of travel, vertically fold or stack, and/or may forwardly or rearwardly fold into and out of the transition position. As shown, the agricultural implement 10 is in the form of a pneumatic seeding implement, such as an air drill 10, which vertically folds into the transport position. The air drill 10 generally includes a folding toolbar 14 with a main frame section 16 and at least one wing frame section, such as a pair of left and right wing frame sections 18, 20 that are pivotally connected to the main frame section 16. The left and right wing frame sections 18, 20 pivot upwardly from the work position to be substantially above the main frame section 16, in order to decrease the lateral width of the agricultural implement 10 in the transport position. The agricultural implement 10 may also include various fluid lines 22, e.g. hydraulic or pneumatic air hoses, and row units 24 with seed metering dispensers, disc openers, rollers, and gauge wheels (unnumbered).

The fluid lines 22 may transport particulate matter, for example seed and/or fertilizer, from a storage tank (not shown) to the row units 24. The fluid lines 22 span from the main frame section 16 to each wing frame section 18, 20. Thereby, the fluid lines 22 must also bend or otherwise move to accommodate the folding of the wing frame sections 18, 20. At the pivot points of the wing frame sections 18, 20, the fluid lines 22 are typically provided with an extra amount of line in order to accommodate the movement of the wing frame sections 18, 20. However, increasing the overall length of the fluid line 22 generally lowers of the efficiency of the transportation system in that the additional amount of line adds to the frictional forces within the fluid passageways of the fluid lines 22. Further, the fluid lines 22 may also become damaged, e.g. kinked, torn, stretched, and/or scuffed, during folding or unfolding of the agricultural implement 10 as a result of the additional amount of line provided at the pivot connections of the wing frame sections 18, 20.

Figure 2:
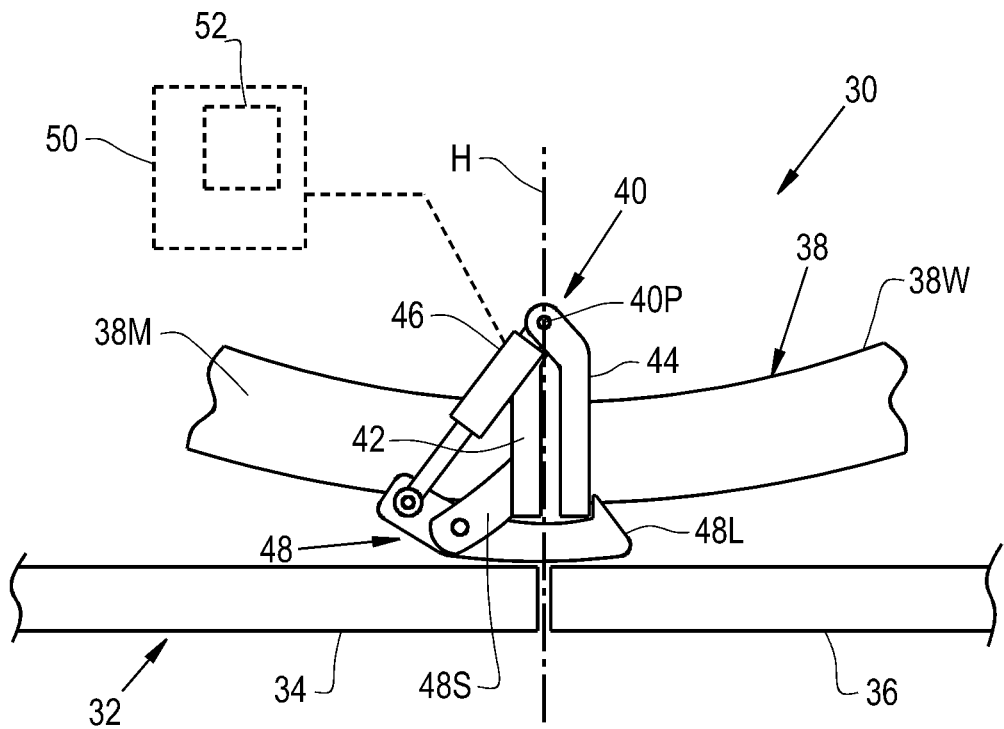
FIG. 2 illustrates an exemplary embodiment of a wing hinge coupling, in accordance with an exemplary embodiment of the present invention.
Figure 3:
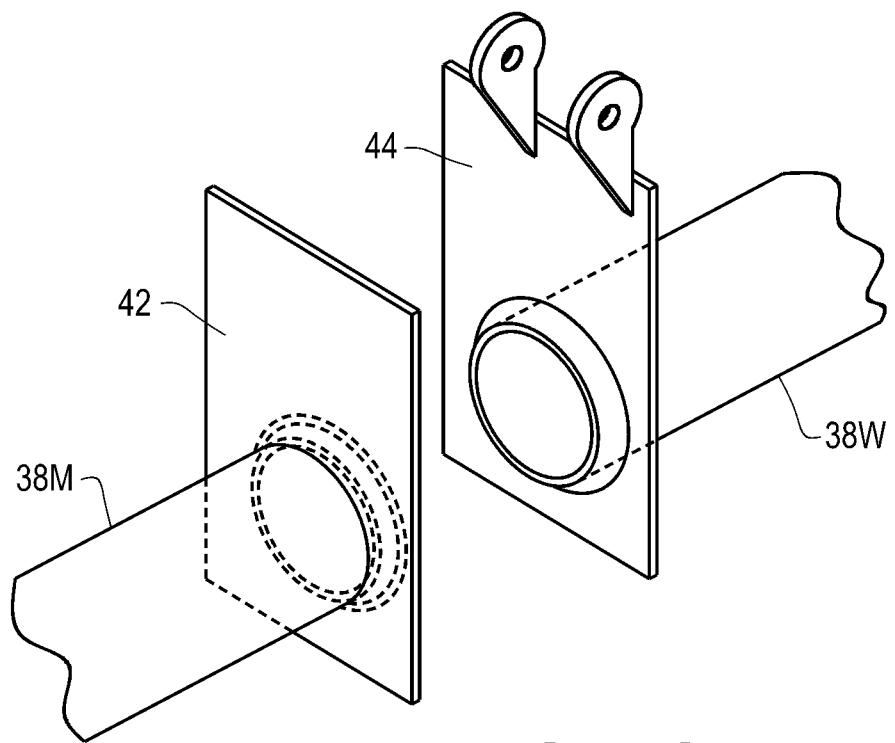
FIG. 3 illustrates a perspective view of the wing hinge coupling of FIG. 2.
Figure 4:
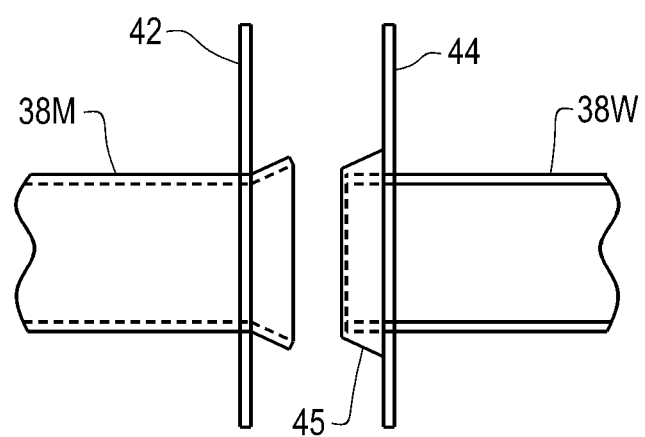
FIG. 4 illustrates a side view of the wing hinge coupling of FIGS. 2-3.

Referring now to FIGS. 2-4, there is shown an exemplary embodiment of an agricultural implement 30. The agricultural implement 30 generally includes a frame 32 with a main frame section 34, at least one wing frame section 36, such as a pair of wing frame sections 36 which are movably, e.g. pivotally, coupled to the main frame section 34; thereby defining a respective hinge line "H" at each pivot location between the wing frame sections 36 and the main frame section 34. The agricultural implement 30 is configured for transitioning in between a work position and a transport position in which the wing frame sections 36 are stored relative to the main frame section 34. The wing frame sections 36 may be folded vertically, forwardly, and/or rearwardly relative to the main frame section 34 in order to position the wing frame sections 36 in the transport position. The agricultural implement 30 also includes various conveyance lines 38 and at least one coupling device 40.

By way of example only, the agricultural implement 30 is shown to be in the form of an air drill 10, as discussed above, with the addition of the coupling device(s) 40. However, the agricultural implement 30 may be in the form of any desired agricultural implement 10 that transitions between work and transport positions and which has at least one fluid line extending between a main section and a wing frame section. For example, the agricultural implement 30 may be in the form of an implement with tillage, such as a disk harrow, or a seed or fertilizer dispensing implement, such as a planter or an air drill. For instance, the agricultural implement 30 may be in the form of an EARLY RISER® series planter, available from Case IH, LLC.

The various conveyance lines 38 may be supported by the frame 32 and span from the main frame section 34 to the at least one wing frame section 36. The conveyance lines 38 can be in the form of any desired fluid lines 38 which convey liquid, gas, and/or particulate matter. For example, the conveyance lines 38 can be in the form of pneumatic air hoses and/or hydraulic fluid lines. As shown, the fluid lines 38 are in the form of pneumatic air hoses 38 that transport seed and/or fertilizer therethrough. However, the fluid lines 38 can be in the form of hydraulic lines which transport hydraulic fluid in between the main frame section 34 and the at least one wing frame section 36. The conveyance lines 38 can be composed of any desired material, such as rubber. At least one conveyance line 38 of the multiple conveyance lines 38, which extend between the main frame section 34 and the at least one wing frame section 36, can be associated with a respective coupling device 40. In more detail, a first line portion 38M of the at least one conveyance line 38 can be associated with the main frame section 34, and a second line portion 38W can be associated with each wing frame section 36 such that the respective coupling device 40 is positioned in between the first and second line portions 38M, 38W.

Each coupling device 40, which may also be referred to as a wing hinge air pack coupling device, is supported by the frame 32 of the agricultural implement 30. Each coupling device 40 is configured for removably coupling the first and second line portions 38M, 38W of the at least one conveyance 38 to each other. Each coupling device 40 generally includes a first coupling member 42, a second coupling member 44, an actuator 46, and a latch 48 (FIG. 2).

The first coupling member 42 may be movably, e.g. pivotally, attached to the second coupling member 44, at a pivot axis 40P. The pivot axis 40P may be located on the hinge line H. The first coupling member 42 may be attached to the first line portion 38M of the at least one conveyance line 38, and the second coupling member 44 member may be attached to the second line portion 38W of the at least one conveyance line 38. Hence, the first and second coupling members 42, 44 couple the first line portion 38M and the second line portion 38W of the at least one conveyance line 38 in the work position and uncouple the first line portion 38M and the second line portion 38W of the at least one conveyance line 38 in the transport position. Each coupling member 42, 44 can be in the form of a coupling ring with a connecting member (unnumbered). The connecting members may each include a hole so that a pin, or any other desired fastener, extends through the holes and pivotally connects each connecting member.

Each coupling device 40 may also include at least one seal 45 for fluidly sealing the line portions 38M, 38W (FIG. 4). For example, the second line portion 38W may include the seal 45 such that as the respective wing frame section 36 is positioned into the work position, the seal 45 at least partially fits within the first line portion 38M in order to fluidly seal the line portions 38M, 38W together. The seal 45 may be in the form of any desired seal 45, such as a rubber o-ring or gasket. Alternatively, each coupling member 42, 44 and/or the respective ends of the line portions 38M, 38W may include a respective seal which mates with the corresponding seal on the juxtaposed coupling member 42, 44 and/or line portions 38M, 38W, respectively. Further, each coupling member 42, 44 and/or the respective ends of the line portions 38M, 38W may additionally include a respective shutoff valve in order to selectively close off the coupling members 42, 44 or the ends of the line portions 38M, 38W once the folding, i.e., transition from the work position to the transport position, of the coupling device 40 begins.

The actuator 46 can be interconnected between the second coupling member 44 and the latch 48. The actuator 46 can be configured for actuating the latch 48. The actuator 46 can be in the form of any desired actuator, such as a mechanical linkage or a hydraulic, pneumatic, or electric cylinder. In an alternative embodiment, the actuator 46 may be designed as a biasing member, such as a tension spring (not shown). Additionally, the actuator 46 may be configured for unfolding and folding the second coupling member 44 relative to the first coupling member 42. In this regard, the actuator 46 may be considered to unfold and fold the second coupling member 44 relative to the first coupling member 42 via imparting a force onto the second coupling member 44 to help pivot the second coupling member 44 and/or onto the locking linkage 48L to help pivot the locking linkage 48L relative to the second coupling member 44.

The latch 48 is operably coupled to the first coupling member 42 and to the actuator 46. The latch 48 is configured for mounting the actuator 46 and for selectively (un)locking the coupling members 42, 44 in the work position. The latch 48 can be in the form of one or more linkages, which connect to the actuator 46 by way of known fasteners. For example, the latch 48 can include a pair of linkages; a first, elongated locking linkage 48L and a second, support linkage 48S pivotally connecting the elongated locking linkage 48L to the first coupling member 42. The locking linkage 48L extends at least from the outer side of the first coupling member 42 to the outer side of the second coupling member 44. The locking linkage 48L has a hook end which selectively abuts against the second coupling member 44 and restricts the movement of the coupling members 42, 44. The latch 48 can be composed of any desired material, such as metal. In another exemplary embodiment, the latch 48 may include one or more linkages that connect the latch to the frame 32 and/or to the first coupling member 42. It should be appreciated that the coupling device 40 may not include a latch 48.

In another exemplary embodiment in accordance with the present invention, the agricultural implement 30 may include an electronic control unit (ECU) 50 that is operably coupled to the actuator 46 of the coupling device 40. The ECU 50 can selectively actuate the actuator 46 to unfold or fold the respective coupling device 40 in conjunction with a corresponding movement, i.e., unfolding or folding, of the respective wing frame section 36. The ECU 50 may be additionally operably coupled to the shutoff valves associated with each line portion 38M, 38W in order to selectively open and close the shutoff valves as desired. The ECU 50 may be in the form of a controller 50, which may include a tangible computer readable medium 52 for storing software code or instructions. The ECU 50 may be in the form of any desired ECU. The ECU 50 may be incorporated into existing hardware and/or software of the agricultural vehicle 12 or the agricultural implement 30.

In operation, an operator can input a command into the ECU 50, via a user interface, to transition the agricultural implement 30 into the work position or transport position. Additionally, for example, the ECU 50 may automatically transition between the work position and transport position based upon receiving GPS data. The ECU 50 may first actuate the actuator 46 to help assist in the uncoupling of the coupling members 42, 44 and/or to unlock the latch 48 by moving the hooked end of the locking linkage 48L away from the second coupling member 44. Hence, the ECU 50 can selectively and automatically control the transition between the working and transport positions of the agricultural implement 30.

It is noted that that FIGS. 2-4 show a gap in between the coupling members 42, 44 in the work position; however, this gap is for illustrative purposes only. The gap between the juxtaposed surfaces of the coupling members 42, 44 may or may not exist in the work position. Further, irrespective of whether there is a gap between the juxtaposed surfaces of the coupling members 42, 44, it should be appreciated that the first and second line portions 38W, 38M are fluidly coupled with one another in the work position and are disconnected, i.e., not fluidly coupled, in the transport position.

It is to be understood that any method of the present exemplary invention may be performed by the ECU 50 upon loading and executing software code or instructions. The ECU 50 may include software code or instructions which are tangibly stored on the memory 52, i.e., tangible computer readable medium 52. The computer readable medium 52 may be in the form of a magnetic medium, e.g., a computer hard drive, an optical medium, e.g., an optical disc, solid-state memory, e.g., flash memory, or other storage media known in the art. Thus, any of the functionality performed by the ECU 50 described herein may be implemented in software code or instructions which are tangibly stored on the tangible computer readable medium 52. The ECU 50 loads the software code or instructions via a direct interface with the computer readable medium 52 or via a wired and/or wireless network. Upon loading and executing such software code or instructions by the ECU 50, the ECU 50 may perform any of the functionality described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural implement, comprising:
    a frame with a main frame section and at least one wing frame section movably connected to the main frame section such that the agricultural implement is configured for transitioning in between a work position and a transport position in which the at least one wing frame section is stored relative to the main frame section;
    at least one conveyance line supported by the frame and having a first line portion associated with the main frame section and a second line portion associated with the at least one wing frame section; and
    at least one coupling device, supported by the frame, and including a first coupling member attached to the first line portion of the at least one conveyance line and a second coupling member movably connected to the first coupling member and attached to the second line portion of the at least one conveyance line such that the at least one coupling device couples the first line portion and the second line portion of the at least one conveyance line in the work position and uncouples the first line portion and the second line portion of the at least one conveyance line in the transport position; wherein the at least one conveyance line is one of a pneumatic air line and a hydraulic fluid line.

2. The agricultural implement of claim 1, wherein the at least one wing frame section is pivotally connected to the main frame section, defining a hinge line, and the first and second coupling members are pivotally connected to each other at a pivot axis.

3. The agricultural implement of claim 2, wherein the pivot axis of the at least one coupling device is located on the hinge line.

4. The agricultural implement of claim 2, wherein the at least one coupling device further includes an actuator connected to the second coupling member and configured for unfolding and folding the second coupling member relative to the first coupling member.

5. The agricultural implement of claim 4, wherein the actuator is one of a mechanical linkage, a hydraulic cylinder, a pneumatic cylinder, and an electric cylinder.

6. The agricultural implement of claim 4, wherein the at least one coupling device further includes a latch operably connected to the actuator and the first coupling member and configured for selectively locking the coupling members in the work position.

7. The agricultural implement of claim 4, further including an electronic control unit operably coupled to the actuator and configured for selectively actuating the actuator to unfold and fold the at least one coupling device in conjunction with a corresponding movement of the at least one wing frame section.

8. A coupling device for an agricultural implement having a main frame section, a wing frame section pivotally attached to the main frame section such that the agricultural implement can unfold and fold in between a work position and a transport position, and at least one conveyance line, the coupling device including:
    a first coupling member configured for attaching to a first line portion of the at least one conveyance line associated with the main frame section; and
    a second coupling member pivotally connected to the first coupling member at a pivot axis and configured for attaching to a second line portion of the at least one conveyance line associated with the wing frame section such that the first and second coupling members are configured for unfolding to couple the first line portion and the second line portion of the at least one conveyance line in the work position and for folding to uncouple the first line portion and the second line portion of the at least one conveyance line in the transport position; wherein the at least one conveyance line is one of a pneumatic air line and a hydraulic fluid line.

9. The coupling device of claim 8, further including an actuator connected to the second coupling member and configured for unfolding and folding the second coupling member relative to the first coupling member.

10. The coupling device of claim 9, wherein the actuator is one of a mechanical linkage, a hydraulic cylinder, a pneumatic cylinder, and an electric cylinder.

11. The coupling device of claim 9, further including a latch operably connected to the actuator and the first coupling member and configured for selectively locking the coupling members in the work position.

12. The coupling device of claim 9, further including an electronic control unit operably coupled to the actuator and configured for selectively actuating the actuator to unfold and fold the coupling device in conjunction with a corresponding movement of the wing frame section.

13. A method, comprising the steps of:
    providing an agricultural implement including a frame with a main frame section and at least one wing frame section pivotally connecting the at least one wing frame section to the main frame section, thereby defining a hinge line, such that the agricultural implement is configured for pivoting in between a work position and a transport position in which the at least one wing frame section is folded relative to the main frame section, at least one conveyance line supported by the frame and having a first line portion associated with the main frame section and a second line portion associated with the at least one wing frame section, and at least one coupling device, supported by the frame, and including a first coupling member attached to the first line portion of the at least one conveyance line and a second coupling member pivotally connected to the first coupling member at a pivot axis and attached to the second line portion of the at least one conveyance line, wherein the at least one conveyance line is one of a pneumatic air line and a hydraulic fluid line;

unfolding the first and second coupling members to couple the first line portion and the second line portion of the at least one conveyance line by unfolding the at least one coupling device as the at least one wing frame section unfolds relative to the main frame section to be in the work position; and folding the first and second coupling members to uncouple the first line portion and the second line portion of the at least one conveyance line by folding the at least one coupling device as the at least one wing frame section folds relative to the main frame section to be in the transport position.

14. The method of claim 13, wherein the pivot axis of the at least one coupling device is located on the hinge line.

15. The method of claim 13, wherein the at least one coupling device further includes an actuator connected to the second coupling member and configured for unfolding and folding the second coupling member relative to the first coupling member.

16. The method of claim 15, wherein the actuator is one of a mechanical linkage, a hydraulic cylinder, a pneumatic cylinder, and an electric cylinder.

17. The method of claim 15, wherein the at least one coupling device further includes a latch operably connected to the actuator and the first coupling member and configured for selectively locking the coupling members in the work position.

18. The method of claim 15, further including an electronic control unit operably coupled to the actuator and configured for selectively actuating the actuator to unfold and fold the at least one coupling device in conjunction with a corresponding movement of the at least one wing frame section.

* * * * *